Figure 1:
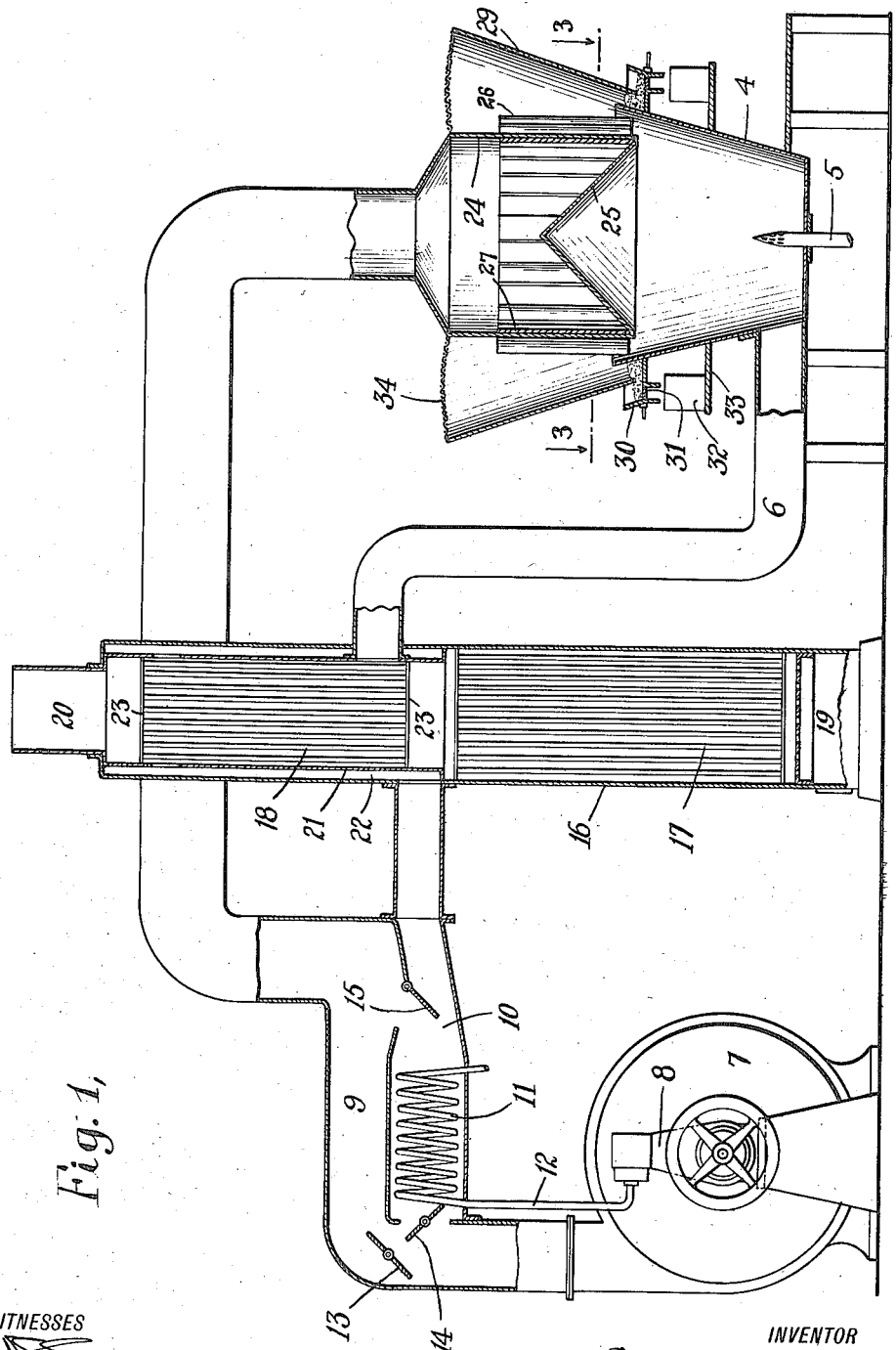

S. H. BUNNELL.
DESICCATING APPARATUS.
APPLICATION FILED MAY 9, 1914.

1,141,102.

Patented June 1, 1915.
2 SHEETS—SHEET 1.

WITNESSES

INVENTOR
S. H. Bunnell,
BY
ATTORNEYS.

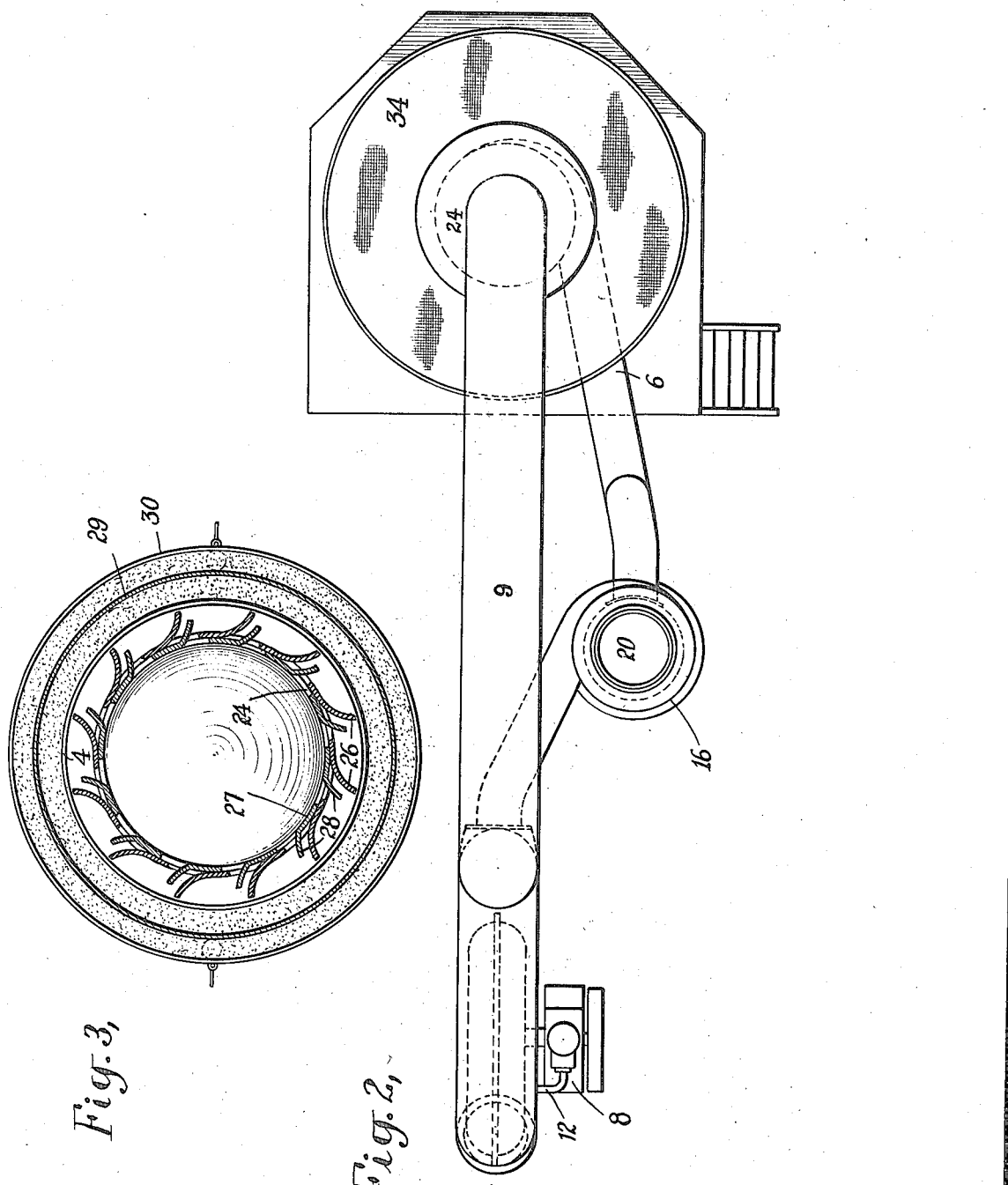

UNITED STATES PATENT OFFICE.

STERLING H. BUNNELL, OF NEW CANAAN, CONNECTICUT, ASSIGNOR TO THE GRISCOM-RUSSELL COMPANY, A CORPORATION OF DELAWARE.

DESICCATING APPARATUS.

1,141,102.          Specification of Letters Patent.        Patented June 1, 1915.

Application filed May 9, 1914. Serial No. 837,360.

*To all whom it may concern:*

Be it known that I, STERLING H. BUNNELL, a citizen of the United States, residing in New Canaan, county of Fairfield, and State of Connecticut, have invented certain new and useful Improvements in Desiccating Apparatus; and I do hereby declare the following to be a full, clear, and exact description of the invention, such as will enable others skilled in the art to which it appertains to make and use the same.

This invention relates to desiccating apparatus adapted particularly for use in the production of a dried, uncooked milk powder which is readily soluble in water.

It has been proposed heretofore, to desiccate milk by spraying it into a moving body of heated air so as to vaporize the liquid content of the milk and immediately thereafter to cool the moving body of air together with the vapor and the milk product carried thereby so as to prevent injury to the dried product.

The present invention is directed to the provision of an improved form of apparatus for desiccating in this manner whereby the powdered product may be readily produced in substantial quantities, whereby greater efficiency and convenience in operation are attained and whereby waste of the liquid material is greatly reduced.

One of the primary features of the invention resides in the provision of means for preventing the liquid milk sprayed into the apparatus from being carried into contact with the walls of the apparatus and means for utilizing centrifugal force for facilitating the collection of the dried product.

In accordance with the invention, the heated air which is to receive the sprayed liquid is forced into a suitable chamber at a tangent thereto so that it will set up a whirling motion within the chamber. The liquid product is sprayed into this whirling air current and is carried around thereby so that movement of the liquid out to the wall of the chamber in a substantially direct path is precluded. Instead, the liquid is carried around with the air and is subjected to the heat thereof so that the liquid content becomes vaporized. The whirling motion of the air is continued beyond the point where the liquid is sprayed into it so that the solid particles maintain this circular movement at the time when the air is cooled so as to prevent injury to the dried product. By reason of this, the dried product is subjected to centrifugal force and moves outwardly to the wall of the chamber, thus facilitating its collection.

The cooling of the body of air is preferably effected by admitting an additional supply of air at a substantially lower temperature and the admission of such air may be effected in such a way as will increase the circular motion of the air carrying the dried product.

The inclosing chamber may have sloping side-walls at the region where the cooler air is admitted and the dried product moving outwardly into contact with these sloping walls will drop down along the walls so that it may be collected in a suitable receptacle provided in a position to receive it.

The preferred embodiment of the invention is illustrated in the accompanying drawings, in which—

Figure 1 is a sectional elevation of the apparatus, Fig. 2 is a top view thereof and Fig. 3 is a sectional detail view on line 3—3 of Fig. 1.

Referring to these drawings, 4 indicates a receptacle or chamber into which the heated air and the liquid product to be desiccated are admitted.

The liquid product is sprayed into the chamber in any suitable manner and I have indicated a sprayer at 5 diagrammatically, this being shown as arranged in a vertical position so as to atomize the liquid upward vertically in the chamber 4. The heated air is forced into the chamber 4 at a tangent to that chamber so that it will set up a whirling motion within the chamber 4.

The conduit through which this heated air is admitted is shown at 6 and by reference to Fig. 2, it will be seen that this conduit 6 enters the chamber 4 at a tangent thereto.

Air is supplied to the conduit 6 by a centrifugal blower 7, the air passing from this blower through a suitable heating apparatus. In the drawings, the blower 7 is shown as operated by an engine 8. The passageway leading from the blower 7 is divided so as to form two conduits 9 and 10. In the conduit 10 is a suitable heating apparatus, this being shown in the present instance as consisting of a coil of pipe 11 which is supplied with exhaust steam from the engine 8 through the pipe 12. Of course, the coil 11 may be supplied with live steam or with exhaust steam from one or more sources other than or additional to the engine 8. The apparatus is provided with suitable valves whereby the flow of air from the blower 7 may be regulated so that the desired proportions of that air will pass through the duct 10 which is provided with the heating coil and through the duct 9 which is not provided with heating means. Also, a valve is provided whereby air may be passed through the coil 11 and into the duct 9. For this purpose, a valve is shown at 13 by which the entrance to the duct 9 may be closed to any desired degree. A second valve 14 controls the entrance to the duct 10 so that the entrance to that duct may be closed to any desired degree. A third valve is shown at 15 controlling a passage between the ducts 9 and 10 at a point beyond the coil 11. This valve 15 may be positioned so as to open the passageway controlled thereby to any desired degree and it is shown as adapted to be moved to a position for closing the duct 10 partially or wholly and leaving the opening into the duct 9 wide open.

The duct 10 leads to a heater whereby the air may be heated to any desired degree before being admitted to the desiccating apparatus through the conduit 6. In the present instance, this heater for the air is shown as combined with a boiler which may be utilized to supply steam to the engine 8 and other apparatus in use at the plant. The boiler and heater are of the vertical tubular form consisting of a cylindrical casing 16 having a multiplicity of vertical tubes 17 and 18 arranged therein. At the base of the structure is a combustion chamber 19 into which the flame of an oil burner is directed. The hot gases from the combustion chamber rise through the tubes 17 and the tubes 18 and pass out through the stack 20, giving up their heat to the water surrounding the tubes 17 and the air surrounding the tubes 18. The tubes 18 are preferably arranged in alinement with the tubes 17 to facilitate cleaning thereof.

A cylindrical wall 21 incloses the tubes 18 so as to provide an annular chamber 22 to which the duct 10 is connected. Near the upper end of the wall 21, a plurality of openings are provided in that wall whereby air may flow from the annular chamber 22 into the space surrounding the tubes 18 and between the headers 23 between which those tubes extend. This space around the tubes 18 communicates with the duct 6 as shown in Fig. 1.

The receptacle 4 is preferably of frusto-conical shape as shown in Fig. 1 and its upper, larger end is open to receive the lower end of the apparatus for introducing the supply of cooler air. This apparatus consists of a hood 24, preferably of cylindrical form, closed at its lower end at 25 and having a plurality of openings at distributed points around its cylindrical wall. The bottom 25 of the hood is preferably of conical shape as shown and extends but a short distance below the upper end of the receptacle 4. Preferably, means are provided for controlling the size of the openings in the hood 24 so that the size of the exit for the air from the hood 24 may be regulated as desired. Also, the walls of the exit or exits from the hood 24 are preferably formed so as to give a circular motion to the air issuing from the hood 24. For this purpose, the openings for the air are preferably provided in the manner shown in Fig. 3 by cutting the metal of the hood 24 and bending the cut portions outwardly as shown at 26 at an incline to a radius of the hood 24. The vane for controlling the size of the exits from the hood 24 consists of a cylinder 27 of sheet metal fitting snugly within the hood 24 and movable therein about its axis. This cylinder 27 has openings in the wall thereof corresponding in number and position to the openings in the hood 24 and formed in the same manner as that above described. The outwardly directed walls 28 of the vane or regulator project through the openings in the wall of the hood 24 as shown in Fig. 3 so that these outwardly bent portions 28 assist in directing the air issuing from the hood in a circular course.

Surrounding the hood 24 is a wall 29 whose sides slope inwardly toward the bottom thereof. This wall 29 is mounted in position with its lower end a short distance below the upper end of the receptacle 4 and this lower, smaller end of the wall 29 is of a diameter slightly in excess of the diameter of the upper end of receptacle 4.

An annular tray 30 is secured to the wall of the receptacle 4 a short distance below the upper end thereof so that the bottom of the tray is a little below the lower end of the wall 29 and so that the upright wall of the tray 30 lies outside of the lower end of the wall 29.

In the bottom wall of the tray 30 are one or more openings adapted to be closed by removable plugs 31 which plugs may be removed to permit the discharge of the powdered product collecting in the tray 30 into receptacles 32 which may be supported upon a shelf 33.

The upper end of the collecting apparatus may be closed by a fabric 34, this being secured at one edge to the upper end of the wall 29 and at the other edge to the hood 24.

In the operation of the apparatus, the blower 7 is set in motion to supply relatively hot air to the lower end of the collector and cooler air to the hood 24, the temperature of the latter being regulated by passing more or less of it through coil 11 by means of valves 13, 14 and 15. The air entering the bottom of the collector through the conduit 6 is directed into the receptacle 4 tangentially so that it sets up a whirling motion therein and the milk or other product to be desiccated is atomized into this whirling body of air by the sprayer 5. The air admitted to the apparatus through the conduit 6 is preferably heated to a temperature of about 300° F. This may readily be done by controlling the supply of fuel to the boiler 16. When the atomized liquid comes in contact with this heated air, the liquid content thereof is vaporized and effective vaporization of the liquid in the material to be desiccated is insured by the circular motion of the air within the receptacle 4 which holds the material sprayed into it in suspension for a longer time. Also, this motion of the air prevents waste which would result from the movement of the atomized liquid into contact with the walls of the receptacle 4. The air, the vapor and the dried product carried thereby move upwardly within the receptacle 4 until they arrive within the space between the wall 29 and the hood 24. At this time, the air and the product carried thereby are cooled by coming in contact with the cooler air issuing from the hood 24, this air being supplied by the blower 7 through the duct 9. The temperature of this air must be regulated with reference to the outside temperature so that it will not cause precipitation of the vapor in the air around the hood 24 but will rapidly reduce the temperature of that air to such a degree that the dried product will not be injured. The circular motion of the air in the chamber is continued after that air enters the space surrounding the hood 24, and is augmented by the air issuing from the hood 24 which air is directed in a circular path by the inclined walls 26 and 28 of the hood 24 and vane 27. By reason of this circular motion of the air, the dried particles carried thereby are caused to move outwardly by centrifugal force until finally they come in contact with the inclined wall 29 and having done so, these particles drop down along the inclined wall 29 and accumulate in the tray 30. The air and the vapor carried thereby finally escape through the fabric 34 and such particles of the dried product as continue to be carried thereby are caught by this fabric. At intervals during the operation of the apparatus, the fabric 34 is shaken so as to cause particles of the dried product caught thereby to drop vertically upon the wall 29 and into the tray 30. The accumulated dry product in tray 30 effects a seal of the space between the lower end of wall 29 and the upper end of receptacle 4. When sufficient powder has accumulated in tray 30, it may be passed through the openings in the bottom thereof and into receptacle 32. The proper amount of air to be admitted through the hood 24 depends upon conditions which very and this amount may therefore be regulated as required by movement of the vane 27 within the hood so as to adjust the size of the openings through which the air passes from the hood.

I claim:

1. A desiccating apparatus comprising the combination of a receptacle, means for admitting heated air to the receptacle and causing the air to set up a circular motion within the receptacle, a sprayer for spraying the material to be desiccated into the air within the receptacle and means for rapidly cooling the air and the product carried thereby; substantially as described.

2. A desiccating apparatus comprising the combination of a receptacle, means for admitting air to the receptacle and causing the air to set up a circular motion within the receptacle, a spraying apparatus for spraying the material to be desiccated into the moving body of air and means for cooling the air and the product carried thereby while continuing the circular movement of the air; substantially as described.

3. A desiccating apparatus comprising the combination of a receptacle, means for forcing the heated air into the receptacle to establish a circular movement of the air within the receptacle, a sprayer for spraying the material to be desiccated into the moving body of air and means for introducing cooler air into the moving body of heated air for rapidly cooling the same; substantially as described.

4. A desiccating apparatus comprising the combination of a receptacle circular in cross-sections, means for forcing heated air tangentially into the receptacle to establish a circular motion of the air within the receptacle, a sprayer for spraying the material to be desiccated into the moving body of air within the receptacle and means for rapidly cooling the air and the product carried thereby; substantially as described.

5. A desiccating apparatus comprising the combination of a receptacle circular in cross-sections, means for forcing heated air tangentially into the receptacle, spraying apparatus for spraying the material to be desiccated into the moving body of air and means for cooling the air and the product carried thereby while continuing the circular movement of the air; substantially as described.

6. A desiccating apparatus comprising the combination of a receptacle, a duct for heated air entering into same tangentially, means for spraying the material to be desiccated into the receptacle, means for introducing cooler air into the receptacle at a point distant from the conduit and said spraying means, the wall of the receptacle surrounding said last-named means being inclined, and a receiver for the dried product at the lower end of said inclined wall; substantially as described.

7. A desiccating apparatus comprising the combination of a receptacle, a conduit for heated air entering the same substantially tangentially, spraying apparatus for spraying the material to be desiccated into the receptacle and a duct for cooling air entering the receptacle at a point distant from said conduit and said spraying apparatus; substantially as described.

8. A desiccating apparatus comprising the combination of a receptacle circular in cross-sections, a conduit for heated air entering the same tangentially, a spraying apparatus for spraying the material to be desiccated into the receptacle and a duct for cooling air entering the receptacle and concentric therewith and having radially disposed outlets; substantially as described.

9. A desiccating apparatus comprising the combination of a receptacle, a conduit for heated air entering the same substantially tangentially, a duct for cooling air entering the receptacle at a point distant from said conduit and having radially disposed outlets and means for adjusting the size of the outlets from said duct; substantially as described.

10. A desiccating apparatus comprising the combination of a receptacle which is circular in cross-sections and larger at one end than at the other, a conduit entering the receptacle tangentially near the smaller end thereof, means for spraying the material to be desiccated into the receptacle, and a duct entering the larger end of the receptacle concentric with the receptacle and having a plurality of radially disposed outlets; substantially as described.

11. A desiccating apparatus comprising the combination of a receptacle, a conduit for heated air entering the same substantially tangentially, a duct for cooling air entering the receptacle at a point distant from said conduit and having radially disposed outlets, the wall of the receptacle surrounding the outlets from said duct being inclined, and a receiver for the dried product at the lower end of said inclined wall; substantially as described.

12. A desiccating apparatus comprising the combination of a receptacle, a conduit for heated air entering the same substantially tangentially, a duct for cooling air entering the receptacle at a point distant from said conduit, a blowing apparatus for supplying air to said conduit and said duct, a heater and means for conveying air from the blower through the heater to either the conduit or the duct; substantially as described.

13. A desiccating apparatus comprising the combination of a receptacle, means for forcing heated air substantially tangentially into the receptacle to establish a circular motion of the air within the receptacle, a spraying apparatus for spraying the material to be desiccated into the moving body of air within the receptacle, and means for introducing cooler air into the receptacle in a direction to continue the circular motion of the air therein to effect rapid cooling of the heated air and the product carried thereby; substantially as described.

14. A desiccating apparatus comprising the combination of a desiccating chamber, means for admitting heated air to one part of the chamber, means for spraying the material to be desiccated into the air thus admitted and means for admitting cooler air to another part of the chamber to rapidly cool the heated air therein and the product carried by that air; substantially as described.

15. A desiccating apparatus comprising the combination of a desiccating chamber which is larger at one end than at the other, means for admitting heated air to the smaller end of the chamber, means for spraying the material to be desiccated into the air thus admitted and means for admitting cooler air to the chamber at the larger end thereof to rapidly cool the heated air in the chamber and the product carried thereby; substantially as described.

16. A desiccating apparatus comprising the combination of a receptacle of circular form, means for admitting heated air to the receptacle near one end thereof, means for spraying the material to be desiccated into the receptacle and a hood entering the receptacle at the other end thereof concentric with the receptacle and adapted to convey cooler air to the receptacle; substantially as described.

17. A desiccating apparatus comprising the combination of a receptacle of circular form larger at one end than at the other, means for admitting heated air to the smaller end of the receptacle, a sprayer for spraying the material to be desiccated into the receptacle and a hood entering the larger end of the receptacle concentric therewith and provided with radial openings for admitting cooler air to the receptacle; substantially as described.

In testimony whereof I affix my signature, in presence of two witnesses.

STERLING H. BUNNELL.

Witnesses:
 WM. S. EDMUNDS,
 VIOLET C. BENNETT.